Patented July 22, 1952

2,604,429

UNITED STATES PATENT OFFICE 2,604,429

VETERINARY ANAESTHETIC PREPARATION

George Harold Clark and Francis Leslie Rose, Blackley, Manchester, and Herbert Butler Parry, Newmarket, England, assignors to Imperial Chemical Industries Limited, a corporation of Great Britain No Drawing. Application July 28, 1949, Serial No. 107,388. In Great Britain July 15, 1949

6 Claims. (Cl. 167—52)

This invention relates to veterinary medicinal preparations and more particularly it relates to veterinary anaesthetics especially suitable for anaesthesia of horses.

In United Kingdom specification No. 590,927 there are described and claimed compositions suitable for use as veterinary hypnotics and general veterinary anaesthetics which are aqueous dispersions whereof the dispersed phase comprises 2-($\beta$-naphthoxy)-ethanol in the form of small particles of which the greatest linear dimension does not exceed 150 microns.

We have now found that these compositions are improved as veterinary anaesthetics, especially for use in anaesthesia of horses if, besides the 2-($\beta$-naphthoxy)-ethanol, there is incorporated therein a barbituric acid derivative.

According to our invention we provide compositions useful as veterinary anaesthetics which are aqueous dispersions comprising 2-($\beta$-naphthoxy)-ethanol and, for each 100 parts by weight of the said 2-($\beta$-naphthoxy)-ethanol, between 5 and 75 parts by weight of one or more barbituric acid derivatives of the formula

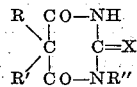

wherein R and R' may be hydrocarbon radicals, R'' may be hydrogen or a hydrocarbon radical and X may be oxygen or sulphur, in the form of its free acid.

Thus as barbituric acid derivatives which may be used there are for example 5-cyclohexen-2-yl-5-allyl - 2 - thiobarbituric acid, 5 - ethyl - 5 - (1-methylbutyl)-2-thiobarbituric acid, N-methyl-5-cyclohexen-2-yl-5-methylbarbituric acid or 5-ethyl - 5 - (1 - methylbutyl) - barbituric acid. Of these we prefer to use 5-cyclohexen-2-yl-5-allyl-2-thiobarbituric acid. When using this substance we find that the best proportion of the barbituric acid derivative is between 20 and 40 parts by weight of barbituric acid derivative for each 100 parts by weight of 2-($\beta$-naphthoxy)-ethanol. As can be seen from the above, R may be an alkyl radical, an alkenyl radical, or a cyclohexenyl radical, and R' may be an alkyl radical or an alkenyl radical.

The compositions of this invention may be made either by first mixing together the barbituric acid derivative and the 2-($\beta$-naphthoxy)-ethanol or each may separately be introduced into the aqueous continuous phase.

The compositions of the invention are administered to the animal intravenously. They are particularly suitable for producing anaesthesia for periods up to about 30 minutes in the horse. They show marked improvements over those described in United Kingdom specification No. 590,927 in that there is in the animal a better and more complete depression of head and neck function, there is an improved muscular relaxation and there is a smaller acceleration in respiration. Moreover the dose of 2-($\beta$-naphthoxy)-ethanol necessary to induce anaesthesia, is smaller, so that the amount administered, in relation to the toxic dose, is smaller than when 2-($\beta$-naphthoxy)-ethanol is used alone, with a consequent added safety to the anaesthetised animal.

These advantages are produced without any of the disadvantages consequent upon use of barbituric acid derivatives alone, such as prolongation of the recovery period with protracted muscular incoordination. Recovery, when the preferred dose is given, is as speedy and complete as is the case when 2-($\beta$-naphthoxy)-ethanol is used alone, or very nearly so.

The preferred dose when the barbiturate is 5-cyclohexen - 2 - yl - 5 - allyl - 2 - thiobarbituric acid, amounts to 20–40 milligrams of 2-($\beta$-naphthoxy)-ethanol per kilogram of animal weight and the preferred rate of administration is 0.25 milligram 2-(naphthoxy)-ethanol per kilogram of animal weight per second. Such a dose, given at such a speed, is sufficient to keep the animal anaesthetised for 15–20 minutes and a further 15–20 minutes of anaesthesia can be produced by a repetition of the dose. Provided anaesthesia be not maintained longer than about 30–40 minutes there is almost no muscular incoordination upon recovery such as is markedly the case when the relatively expensive barbituric acid derivatives are used alone. Thus the dispersions of this invention are particularly suitable for use on horses for operations of short duration such as, for example, castration.

In making the compositions of this invention the 2-($\beta$-naphthoxy)-ethanol and the barbituric acid derivative, either separately or in the form of a solution of one in the other, are dispersed in water by agitation preferably in the presence of dispersing agents and other added materials to provide a stable dispersion of a nature suitable for intravenous injection into animals. A preferred dispersion contains a dispersing agent which may be any suitable dispersing agent which is not toxic to the animal. We have found that the following dispersing agents, sodium dinaphthylmethane di-sulphonate (see Example 1 of United Kingdom specification No. 7,137/13), sodium cetyl sulphate, the sodium salt of highly sulphonated oleic acid, a polyglyceryl ricinoleate made as described in Example 2 of German specification No. 575,911, a condensation product of iso-octyl phenol with 7.5 molecular proportions of ethylene oxide (see United Kingdom specification No. 470,181), cetylmethylammonium bromide and dodecylpyridinium bromide, are very suitable. The dispersion also advisedly contains a flocculating agent which may be for example sodium chloride, magnesium sulphate, the sodium salt of a carboxymethyl cellulose ether or cellulose methyl ethyl ether. It also should contain a preservative, as for example chlorocresol, and, to prevent blood from clotting in the hypodermic needle, an anticoagulant for blood, conveniently sodium citrate.

The following dispersion has been found very convenient for use in anaesthesia of horses. The parts are by weight.

10 parts 2-(β-naphthoxy)-ethanol
3.0 parts 5-cyclohexen-2-yl-5-allyl-2-thiobarbituric acid
1 part sodium citrate
0.5 part sodium carboxymethyl cellulose ether
0.125 part sodium dinaphthyl disulphonate
0.1 part chlorocresol
in 89 parts of water.

The following examples illustrate the preparation of the compositions and dispersions of this invention. The parts are by weight.

*Example 1*

10 parts of 2-(β-naphthoxy)-ethanol are heated at 85°–90° C. and 3.0 parts of 5-cyclohexen-2-yl-5-allyl-2-thiobarbituric acid are stirred in. The molten mixture is then added to an excess of cold water which is stirred rapidly so that a particulate solid suspension is formed. The solid is filtered off and is used without further treatment for the preparation of a dispersion as described in Example 2.

*Example 2*

A dispersion is made by grinding the solid made as described in Example 1 to a solid particle average size not exceeding 30 microns, in a solution of 0.125 part sodium dinaphthylmethane disulphonate in 35 parts of water. To this dispersion is added a solution of 1 part of sodium citrate, 0.5 part of sodium carboxymethyl cellulose ether, 0.1 part of chlorocresol in 54 parts of water. The dispersion is fluid and non-caking and may be immediately used for anaesthetisation of horses.

*Example 3*

A dispersion is made as described in Example 2 but using instead of the sodium dinaphthylmethane disulphonate 0.125 part of a condensation product of commercial cetyl alcohol with 30 molecular proportions of ethylene oxide. The dispersion is similar to that of Example 1.

*Example 4*

A dispersion is made by grinding 10 parts of 2-(β-naphthoxy)-ethanol, 3.0 parts of 5-cyclohexen-2-yl-5-allyl-2-thiobarbituric acid, 0.125 part of sodium dinaphthylmethane disulphonate and 35 parts of water until the solid particle average size not exceeding 30 microns. To this dispersion is added a solution of 1 part of sodium citrate, 0.5 part of sodium carboxymethyl cellulose ether, 0.1 part of chlorocresol in 54 parts of water. The dispersion is fluid and non-caking and may be immediately used for anaesthetisation of horses.

We claim:

1. A composition which is an aqueous dispersion comprising 2-(β-naphthoxy)-ethanol and, for each 100 parts by weight of the said 2-(β-napthoxy)-ethanol, between 5 and 75 parts by weight of at least one barbituric acid derivative in the form of its free acid and having the formula

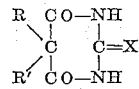

wherein R is selected from the group consisting of alkyl, alkenyl and cyclohexenyl radicals, R′ is selected from the group consisting of alkyl and alkenyl radicals, and X is selected from the group consisting of oxygen and sulfur.

2. A composition as set forth in claim 1 wherein the barbituric acid derivative is 5-cyclohexen-2-yl-5-allyl-2-thiobarbituric acid.

3. A composition which is an aqueous dispersion comprising 2-(β-napthoxy)-ethanol and, for each 100 parts by weight of the said 2-(β-napthoxy)-ethanol, between 20 and 40 parts by weight of at least one barbituric acid derivative in the form of its free acid and having the formula

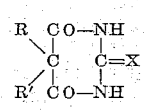

wherein R is selected from the group consisting of alkyl, alkenyl and cyclohexenyl radicals, R′ is selected from the group consisting of alkyl and alkenyl radicals, and X is selected from the group consisting of oxygen and sulfur.

4. A composition as set forth in claim 1 wherein the barbituric acid derivative is 5-ethyl-5-(1-methylbutyl)-2-thiobarbituric acid.

5. A composition as set forth in claim 1 wherein the barbituric acid derivative is N-methyl-5-cyclohexen-2-yl-5-methyl-barbituric acid.

6. A composition as set forth in claim 1 wherein the barbituric acid derivative is 5-ethyl-5-(1-methylbutyl)-barbituric acid.

GEORGE HAROLD CLARK.
FRANCIS LESLIE ROSE.
HERBERT BUTLER PARRY.

REFERENCES CITED

The following references are of record in the file of this patent:

UNITED STATES PATENTS

| Number | Name | Date |
|---|---|---|
| 2,061,544 | Bockmühl | Nov. 24, 1936 |
| 2,153,730 | Volwiler | Apr. 11, 1939 |
| 2,478,093 | Fishburn | Aug. 2, 1949 |

OTHER REFERENCES

U. S. Dispensatory, 23d edition (1943), pages 298, 299, 995, 1274 to 1277.

Industrial and Engineering Chemistry, volume 37, October 1945, page 945.